(12) United States Patent
Kochi et al.

(10) Patent No.: US 8,071,208 B2
(45) Date of Patent: Dec. 6, 2011

(54) INTEGRAL SKIN MOLDED ARTICLE AND METHOD OF PREPARING INTEGRAL SKIN MOLDED ARTICLE AND LAMINATE HAVING SKIN

(75) Inventors: Eiju Kochi, Fuji (JP); Naohiro Fujita, Fuji (JP); Takahiro Suwama, Fuji (JP); Shinji Nishikawa, Amagasaki (JP); Hiroaki Ido, Amagasaki (JP)

(73) Assignees: Sumika Bayer Urethane Co., Ltd., Osaka (JP); Nihon Plast Co., Ltd., Shizuoka (JP)

( * ) Notice: Subject to any disclaimer, the term of this patent is extended or adjusted under 35 U.S.C. 154(b) by 267 days.

(21) Appl. No.: 12/232,429

(22) Filed: Sep. 17, 2008

(65) Prior Publication Data

US 2009/0075084 A1    Mar. 19, 2009

(30) Foreign Application Priority Data

Sep. 19, 2007    (JP) ................. P2007-242447

(51) Int. Cl.
     *B32B 5/20*      (2006.01)
     *B32B 3/10*      (2006.01)

(52) U.S. Cl. ............... 428/318.8; 428/318.6; 428/319.3; 428/319.7; 428/319.9; 428/131

(58) Field of Classification Search ............... 428/318.6, 428/319.3, 319.7, 319.9, 318.8, 131
See application file for complete search history.

(56) References Cited

U.S. PATENT DOCUMENTS

| | | | |
|---|---|---|---|
| 4,218,543 A | 8/1980 | Weber et al. | |
| 4,997,858 A * | 3/1991 | Jourquin et al. | 521/118 |
| 5,801,210 A | 9/1998 | Radovich et al. | |
| 6,303,667 B1 | 10/2001 | Kruecke | |
| 7,572,404 B2 * | 8/2009 | Nishikawa et al. | 264/328.6 |
| 2003/0171445 A1 * | 9/2003 | Isobe et al. | 521/155 |
| 2006/0134398 A1 * | 6/2006 | Nakamura et al. | 428/310.5 |
| 2006/0264522 A1 | 11/2006 | Nishikawa et al. | |
| 2007/0148411 A1 * | 6/2007 | Yamada | 428/172 |

FOREIGN PATENT DOCUMENTS

| | | |
|---|---|---|
| CN | 1158626 | 9/1997 |
| EP | 1 717 256 | 11/2006 |
| JP | 53-86763 | 7/1978 |
| JP | 05-056801 | 3/1993 |
| JP | 2000-336138 | 12/2000 |
| JP | 2001-139656 | 5/2001 |
| JP | 2003-19056 | 1/2003 |
| JP | 2006-305916 | 11/2006 |
| JP | 2007-016107 | 1/2007 |
| JP | 2007-090697 | 4/2007 |
| JP | 2007-112142 | 5/2007 |
| JP | 2007-176021 | 7/2007 |

OTHER PUBLICATIONS

Extended European Search Report issued May 7, 2009 in the corresponding European Patent Application EP 08164471, which is a foreign counterpart of this application.
Japanese Office Action dated Jan. 18, 2011 issued in corresponding Japanese Application No. 2008-239019.
Chinese Office Action (with partial English translation) dated Mar. 10, 2011 issued in corresponding Chinese Application No. 200810188788.8.

* cited by examiner

*Primary Examiner* — Hai Vo
(74) *Attorney, Agent, or Firm* — Wenderoth, Lind & Ponack, L.L.P.

(57) ABSTRACT

The present invention provides an integral skin molded article used for vehicle internal parts, which enables good production efficiency and cost reduction and has good external appearance, and a method of preparing an integral skin molded article, and also provides a laminate with a skin comprising the integral skin molded article and a core material, and a method of preparing a laminate with a skin. Disclosed are an integral skin molded article obtained by injecting a polyurethane foam for a skin into a die after injecting a high density polyurethane resin for a core, containing a high density polyurethane resin for a skin, containing a polyol component, 1-methyl-3,5-diethyl-2,4-diaminobenzene and/or 1-methyl-3,5-diethyl-2,6-diaminobenzene, and a blowing agent into the same die; and a method of preparing a laminate with a skin comprising a skin molded article and a core material.

1 Claim, No Drawings

INTEGRAL SKIN MOLDED ARTICLE AND METHOD OF PREPARING INTEGRAL SKIN MOLDED ARTICLE AND LAMINATE HAVING SKIN

TECHNICAL FIELD

The present invention relates to an integral skin molded article comprising a high-density polyurethane resin and a polyurethane foam used for vehicle internal parts such as instrument panels, door panels and airbag covers, a laminate with a skin obtained by laminating core material with an integral skin molded article, a method of preparing an integral skin molded article and a method of preparing a laminate with a skin.

BACKGROUND ART

Conventionally, many materials obtained by various molding methods are used as a skin for vehicle internal parts. These materials and methods include for example, vacuum molding of polyvinyl chloride (PVC), vacuum molding and powder molded articles using thermal plastic olefins (TPO), or slush molded articles of thermal plastic polyurethane (TPU), articles produced by spraying polyurethane material (polyurethane liquid mixtures mixed by collision under high pressure of a polyol and an isocyanate) and articles molded using RIM (Reaction Injection Molding).

Generally methods for producing a laminate using a core material or an integral skin molded article comprising a cushioning material such as a skin formed as described above and polyurethane foam for example include setting a skin and a core material pre-placed in a mold for heating or vacuum molding in order to set in the mold and then injecting polyurethane as a cushioning material between the skin and the core material or a method of adhesive molding in which an adhesive is applied.

However, these methods for producing a laminate using a core material or an integral skin molded article require two molding steps and therefore complicate product processing with respect to equipment or the like, increase production time, increase costs and thus adversely affect productivity.

Furthermore, there are respectively some shortcomings in the materials used for the skin up until now. PVC materials produce dioxin or chlorinated byproducts when decomposed and therefore have an adverse effect on the environment. In addition, disposal and recycling is difficult and therefore such materials are considered not to be preferred.

Vacuumed-molded articles using TPO are not suitable since they are hard to the touch. Powder molded articles require a large amount of energy and time in the molding process and therefore similar to PVC are associated with low efficiency production and therefore are not economic.

Although articles which are slush molded using TPU have improved tactile characteristics, they require large amounts of energy and time in processing, are associated with low efficiency production and therefore are not economic.

Instead of conventionally used TPU slush molding, articles which employ spraying of polyurethane material in order to improve productivity generally attempt to increase productivity by using highly reactive materials. However since dispersal of materials during the spray processing is prohibited, time is required since it is necessary to eliminate dispersed materials from around the mold. Thus the time required to eliminate dispersed material often causes a reduction in productivity. Furthermore the use of materials is higher than the required amount due to the prohibition on dispersal of materials. This therefore increases costs, adversely affects the working environment and thus is not preferred.

Polyurethane materials in the spray used in methods of spraying are liable to be affected by humidity or the surrounding temperature and tend to produce foam as a result of moisture in the air or air in air bubbles in the article. Furthermore the molding of articles for internal parts of large vehicles require spraying of the mold on a number of occasions. Consequently layers of differing density or hardness tend to be generated at the interface regions before and after blasting of polyurethane material. This tendency results in undesirable surface tactile characteristics. For these reasons, there are drawbacks with respect to a lack of uniform tactile characteristics resulting from the density of the skin, that is to say, the thickness or hardness.

Since RIM molded articles using polyurethane materials faithfully reproduce surface irregularities, a superior outer design appearance can be achieved. In addition, since the internal die capacity is fixed, these methods have the advantage of stable density, thickness or hardness and therefore have been applied in a wide range of applications. The thickness of the skin used in the design surfaces of vehicle internal parts is generally approximately from 0.5 mm to 3.0 mm and is generally thicker than RIM molded articles. Consequently flow resistance increases and it is necessary to delay the reaction to an extent in order to fill up to the extremities of the article. As a result, curing time (the time from injection of polyurethane materials into the die up to the commencement of die opening) increases and productivity is adversely affected.

Vehicle internal parts with a skin for example instrument panels or door trim on which a skin is used on the design face, and in particular, an automobile instrument panel, naturally require physical characteristics such as UV stability, anti-wear characteristics, airbag expansion characteristics, durability but also require a skin satisfying quality outer appearance and tactile characteristics. Therefore there is a need for a method of preparing which integrally molds an integral skin molded article comprising semi-hard polyurethane foam in order to soften shocks with the design surface skin, or a laminate comprising a core material which retains the integral skin molded article. The method should reduce cycle times improve productivity with respect to use of materials and reduce production costs.

There is a need for articles and a method of preparing such articles such as vehicle internal parts, in particular for a skin for internal automobile parts, which improves productivity and reduces production costs. There have been several proposals made up to date.

Japanese Unexamined Patent Publication (Kokai) No. 52-142797 discloses a method of preparing a polyurethane flexible molded article using a specific polyol and a specific aromatic diamine. The method disclosed in Japanese Unexamined Patent Publication (Kokai) No. 52-142797 proposes the molding in a short time of a polyurethane flexible body using a specific polyol and a specific aromatic diamine. However the molded article has a weight of 3 to 10 kg or more and is directed to large externally mounted articles, for example, bumper bars. The examples of Japanese Unexamined Patent Publication (Kokai) No. 52-142797 disclose a molded article which has a thickness of 4 mm and which is comparatively hard with a Shore hardness of 84 or more. However, the skin of this disclosure can not be used in the design surface of vehicle internal parts.

Japanese Unexamined Patent Publication (Kokai) No. 53-86763 discloses a method of forming a foam layer by molding a skin using reaction injection molding of a polyurethane material in a die cavity, leaving the skin in the die and setting a second core die capable of forming a cavity corresponding to the thickness of a foam layer instead of removing the first core die. A foam layer which tightly adheres to the skin is formed by injecting a foam molding material into the cavity. The method disclosed in Japanese Unexamined Patent Publication (Kokai) No. 53-86763 proposes a method of integrally forming internal articles with a skin. However the disclosure is only related to a urethane skin material and detailed description of a urethane composition, urethane density or surface hardness related to the present method is not provided and therefore is not sufficient.

Japanese Unexamined Patent Publication (Kokai) No. 2003-19056 discloses a seat cushion using a seamless skin material and a method of preparing same. The method disclosed in Japanese Unexamined Patent Publication (Kokai) No. 2003-19056 proposes a seat cushion formed from a foam body having a shape approximately corresponding to the border of the seat cushion and a seamless skin material which is tightly and integrally adhered to the surface and side faces of the foam body. However this disclosure is only related to a urethane skin material and detailed description of a urethane composition, urethane density or surface hardness related to the present production method is not provided and therefore is not sufficient.

[Patent Document 1] Japanese Unexamined Patent Publication (Kokai) No. 52-142797
[Patent Document 2] Japanese Unexamined Patent Publication (Kokai) No. 53-86763
[Patent Document 3] Japanese Unexamined Patent Publication (Kokai) No. 2003-19056

Thus with respect to integral skin molded articles formed from high density polyurethane resin and polyurethane foam, there is no current solution to the need for a method of forming a skin having a superior external appearance, an integral skin molded article using the skin and a laminate with a skin laminated using a core material which reduces production costs and improves productivity.

DISCLOSURE OF THE INVENTION

The present invention has an object of providing an integral skin molded article used for vehicle internal parts, which enables good production efficiency and cost reduction and has good external appearance, and a method of preparing an integral skin molded article, and also provides a laminate with a skin comprising the integral skin molded article and a core material, and a method of preparing a laminate with a skin laminated with a core material.

The present invention resulted from investigations into solving the above problems and was completed by finding a method of preparing an integral skin molded article formed using polyurethane foam and a high-density polyurethane resin and a method of preparing a integral skin molded article and a laminate with a skin laminated using a core material for use in vehicle internal parts as described hereafter.

The present invention provides an integral skin molded article comprising a skin of a high density polyurethane resin and a core of a polyurethane foam, which is molded in a die using a reaction injection molding process, wherein the high density polyurethane resin comprises a polyol mixture (I) comprising a polyol (I-1), a chain extender (I-2), a catalyst (I-3) and, if required, an auxiliary agent (I-4), and a polyisocyanate compound (II);

the chain extender (I-2) contains 0.7 to 4.5 parts by weight of 1-methyl-3,5-diethyl-2,4-diaminobenzene and/or 1-methyl-3,5-diethyl-2,6-diaminobenzene based on 100 parts by weight of the polyol mixture (I);

the polyurethane foam comprises a polyol mixture (III) comprising a polyol (III-1), a chain extender (III-2), a catalyst (III-3), a blowing agent (III-5) and, if required, an auxiliary (III-4) agent, and a polyisocyanate compound (IV);

the blowing agent (III-5) contains a liquefied carbon dioxide gas; and a surface hardness of the high density polyurethane resin is from 50 to 90 measured with an Asker A hardness meter, a density of the polyurethane foam is from 0.20 to 0.70 g/cm$^3$ and has a hardness of 20 to 70 measured with an Asker C hardness meter, and the hardness on the skin of the integral skin molded article is from 30 to 70 measured with an Asker A hardness meter.

Furthermore, the present invention provides a laminate with a skin, comprising a high density polyurethane resin, a polyurethane foam and a core material, wherein the high density polyurethane resin and the polyurethane foam comprise the integral skin molded article, and the core material is bonded to the skin of the high density polyurethane resin.

Furthermore, the present invention provides a method of preparing an integral skin molded article in which a polyurethane foam is present in a core of a skin of a high density polyurethane resin formed on a die inner surface, the method comprising the steps of:

adjusting a gel time of a liquid mixture of a mixture polyol (I) and a polyisocyanate compound (II) of the high density polyurethane resin to 10 to 30 seconds;

adjusting a cream time of a liquid mixture of a mixture polyol (III) and a polyisocyanate compound (IV) of a polyurethane foam to 3.0 seconds or less; and injecting the liquid mixture of the polyurethane foam into a die at 1 to 30 seconds after completing injection of a high density polyurethane resin liquid mixture into the die so that a skin thickness of the high density polyurethane resin is 0.1 to 2.0 mm.

Furthermore, the present invention provides a method of preparing the integral skin molded article, wherein in addition to the method according, the method further comprises the step of preliminarily installing the core material in the die prior to injecting the high density polyurethane resin liquid mixture, and a laminate with a skin has a high density polyurethane resin skin formed on the surface of the core material and the die inner surface and a core of polyurethane foam.

According to the present invention, vehicle internal parts comprising an integral skin molded article comprising a skin and core, or a laminate with a skin laminating a core material to the skin and core are provided in the same die with a single process. Thus productivity is high and it is possible to reduce manufacturing costs. In addition, a method is provided of producing an integral skin molded article and a laminate with a skin for vehicle internal parts having improved external appearance and a uniform skin thickness.

BEST MODE FOR CARRYING OUT THE INVENTION

The polyol (I-1) comprising the polyol mixture (I) for the high density polyurethane resin is preferably a polyether polyol. The polyether polyol used in the polyol (I-1) includes alkylene oxides such as ethylene oxide or propylene oxide added to hydroxyl group-containing compounds such as propylene glycol, diethylene glycol, glycerin, trimethylolpropane and pentaerythritol and/or compounds having an amino group or a hydroxyl group, such as monoethanolamine, diethanolamine, triethanolamine or the like, and/or an amino group-containing compounds such as ethylenediamine or diaminotoluene.

The polyether polyol in the polyol (I-1) preferably has an average functional group number of 2.0 to 4.0, a hydroxyl value of 18.0 mg KOH/g to 56 mg KOH/g and a content of terminal oxyethylene units of 10 to 25% by weight. Further preferred is an average functional group number of 2.0 to 3.0, a hydroxyl value of 28 mg KOH/g to 50 mg KOH/g and a content of terminal oxyethylene units of 15 to 20% by weight. When the average number of functional groups is from 2.0 to 4.0, the curing time occurs over a more suitable period and the extension characteristics of the molded article are higher. When the hydroxyl value is between 18.0 mg KOH/g to 56 mg KOH/g, the flow characteristics of the liquid mixture (A) (in the present specification, this refers to the liquid mixture of the polyol mixture (I) and the poly isocyanate compound (II)) are improved. Consequently filling is sufficient up to the extremity of the die and results in an improved tactile sensation with a soft skin of the molded article. When the content in terminal oxyethylene units is 10 to 25% by weight, the flow characteristics of the liquid mixture (A) are improved and the curing time is suitable.

The polyether polyol of the polyol (I-1) may be a mixture of two or more substances. In that case, the average functional groups number, the hydroxyl value and the content in terminal oxyethylene units of the mixture is preferably within the above range of 2.0 to 4.0, 18.0 mg KOH/g to 56 mg KOH/g and 10 to 25% by weight and more preferably within ranges of 2.0 to 3.0, 28.0 mg KOH/g to 50 mg KOH/g and a content in terminal oxyethylene units of 15 to 20% by weight.

In this invention, it is essential to use, as a part of the chain extender (I-2), 1-methyl-3,5-diethyl-2,4-diaminobenzene and/or 1-methyl-3,5-diethyl-2,6-diaminobenzene (hereafter referred to as "DETDA").

The amount of DETDA used is 0.7 to 4.5 parts by weight based on 100 parts by weight of the polyol mixture (I). When the composition by weight of DETDA is 0.7 to 4.5, the flow characteristics of the liquid mixture are not adversely affected when molding a high density polyurethane resin of 0.1 mm to 2.0 mm. Furthermore reactivity during gel time is good, flow characteristics during molding are good and thus it is possible to form a skin of 0.1 mm to 2.0 mm. When the amount of DETDA used is less than 0.7 parts by weight, the skin layer is thin and a preferred hardness is not obtained. Therefore a feel or a tactile sensation is not obtained. When the amount of DETDA used is more than 4.5 parts by weight, the reaction is rapid and expansion of the foam layer is not observed.

When a glycol chain extender is used as the other chain extender (I-2), it is preferred to use in combination with DETDA. The glycol chain extender includes ethylene glycol, propylene glycol, butanediol, or diethylene glycol, with ethylene glycol particularly preferred.

The amount of the glycol chain extender used in combination with DETDA is preferred to be 5.0 to 12.0 parts by weight in 100 parts by weight of the polyol mixture (I). In particular, 6.0 to 10.5 parts by weight is preferred.

The flow characteristics of the liquid mixture (A) are particularly improved by 5.0 to 12.0 parts by weight of the glycol chain extender and facilitate the formation of a 0.1 mm to 2.0 mm skin. The extension of the high density polyurethane resin is better and the skin of the molded article is softer and has a good tactile sensation.

A conventional urethane catalyst may be used as the catalyst (I-3). Urethane catalysts are amine catalysts or metal catalysts. Examples of amine catalysts include tertiary amines such as triethyenediamine, pentamethyldiethylenetriamine, 1,8-diazabicyclo-5,4,0-undecene-7, dimethylaminoethanol, tetramethylethylenediamine, dimethylbenzylamine, tetramethylhexamethylenediamine, bis(2-dimethyaminoethyl)ether, N,N'-dimethylaminopropylamine, N,N'-dimethylaminopropanol, N,N'-dimethylethanolamine, 1-isobutyl-2-methylimidazole, and tertiary amines such as N-methyl-N'-hydroxyethylpiperazine, N,N'-dimethylaminoethoxyethanol, N,N,N'-trimethylaminoethylethanolamine. Metal catalysts include dimethyltin dilaurate, dibutyltin dilaurate, potassium acetate, potassium octoate, potassium lactate, stannous dioctate. The catalyst (I-3) may comprise an amine catalyst or a metal catalyst used in isolation or may comprise an amine catalyst and a metal catalyst used in combination.

The amount of the catalyst (I-3) is adjusted so that the gel time of the liquid mixture (A) is from 10.0 to 30.0 seconds. When the gel time is in the range of 10 to 30 seconds, the curing time for molding is good and molding can be completed in a short time.

When the gel time is in the range of 10 to 30 seconds, the time during which the liquid mixture (A) flows (flow characteristics) is also within 5 to 15 seconds. Thus appropriate flow characteristics are obtained in which the liquid mixture (B) of polyurethane foam presses and extends the liquid mixture (A). Therefore superior filling characteristics with respect to the die and a uniform skin are obtained.

The amount of the catalyst (I-3) is preferred to be 0.008 to 1.20 parts by weight in 100 parts by weight of the polyol mixture (I). In particular, 0.10 to 1.00 parts by weight is preferred. When using the amine catalyst and the metal catalyst in combination, the amount of amine catalyst is from 0.08 to 1.10 parts by weight in 100 parts by weight of the polyol mixture (I) and in particular, 0.10 to 0.95 parts by weight is preferred. The amount of metal catalyst is from 0.005 to 0.10 parts by weight in 100 parts by weight of the polyol mixture (I) and in particular, 0.01 to 0.05 parts by weight is preferred.

The gel time is obtained by the following method. At an ambient temperature of 25° C., using a high-pressure molding machine, the temperature of the mixture polyol (I) and the polyisocyanate compound (II) is 30° C., and the discharge amount of the liquid mixture (A) is adjusted to 200 g/second. 200 g of the liquid mixture is injected into a 500 ml polycup. Thus measurement is possible by drawing the tip of a toothpick is drawn in the surface of the mixture (A) which has started to react.

The "gel time" means the time from starting to inject the liquid mixture (A) which has started to react to starting to pull the filiform body (gel) after starting injecting.

"Flow characteristics" means the time, under the same conditions for the high-pressure molding machine during measurement of the gel time, from the time the liquid mixture (A) flows on an aluminum board regulated to 60° C. until the time expansion of the liquid mixture (A) stops.

An auxiliary agent (I-4) may be used as required. Examples of auxiliary agents (I-4) include foam stabilizers for example silicon foam stabilizer, interfacial active agents, filling agents, weatherproofing agents such as antioxidants, UV absorbing agents, stabilizers, for example 2,6-di-t-butyl-4-methylphenol, tetrakis[methylene-3-(3',5'-di-t-butyl-4-hydroxyphenyl)propionate]methane. The amount of the auxiliary agent (I-4) is 10% or less by weight in 100 parts by weight of the polyol mixture (I), for example 0.1 to 5.0% by weight.

In the polyol mixture (I) for the high density polyurethane resin, intentional addition of blowing agents such as addition of water or liquefied carbon dioxide gas or formic acid and CFC or HCFC is not performed. Although contamination by moisture existing originally in material for the polyol mixture (I) or water such as moisture entering during handling can not be avoided, the amount of water in the polyol mixture (I) is preferably 0.15% by weight or less.

In the present invention, the polyisocyanate compound (II) can be a polyisocyanate compound having two or more isocyanate groups in the molecule used in a normal polyurethane resin composition. For example, these include aromatic isocyanates such as diphenylmethane diisocyanate, tolylene diisocyanate, polyphenylenepolymethylene polyisocyanate, xylylene diisocyanate, tetramethylxylylene diisocyanate, 1,5-naphthalene diisocyanate, and urethane modified polyisocyanates, carbodiimide modified polyisocyanates, isocyanurate modified derivates of the above isocyanates.

Among the above, aromatic polyisocyanates and/or modifications thereof are preferred from the point of view of reactivity and cost of materials. When photo-resistant characteristics are required, it is preferred to coat the surface of the resin with a photo-resistant coating.

The mixing ratio of the polyol mixture (I) to the polyisocyanate compound (II) may be from 90 to 115 as an isocyanate index [(the ratio of the equivalent amount of active hydrogen in polyol mixture (I) to the equivalent amount of isocyanate groups in the polyisocyanate compound (II))× 100].

In the present invention, the density of the high density polyurethane resin should be from 0.85 g/cm$^3$ to 1.10 g/cm$^3$, and preferably from 0.90 g/cm$^3$ to 1.10 g/cm$^3$. When the density is from 0.85 g/cm$^3$ to 1.10 g/cm$^3$, it is not possible to visually confirm bubbles on the surface which therefore allows for use as an improved skin for internal parts.

The polyol (III-1) for the polyol compound (III) used in the polyurethane foam in the present invention may be the same as that used for the high density polyurethane resin.

The polyol (III-1) for the polyol compound (III) is preferably a polyether polyol. The polyether polyol used in the polyol (III-1) includes compounds adding alkylene oxides such as ethylene oxide or propylene oxide to hydroxyl group-containing compounds such as propylene glycol, diethylene glycol, glycerin, trimethylolpropane and pentaerythritol and/or compounds having an amino group or a hydroxyl group such as monoethanolamine, diethanolamine, triethanolamine or the like, and/or amino group-containing compounds such as ethylenediamine or diaminotoluene.

The polyether polyol in the polyol (III-1) preferably has an average functional groups number of 2.0 to 4.0, a hydroxyl value of 18.0 mg KOH/g to 56 mg KOH/g and a content of terminal oxyethylene units of 10 to 25% by weight. More preferably, the average number of functional groups is from 2.0 to 3.0, the hydroxyl value is between 28 mg KOH/g to 50 mg KOH/g, and the content in terminal oxyethylene units is from 15 to 20% by weight. When the average number of functional groups is from 2.0 to 4.0, the curing time occurs over a more suitable period. When the hydroxyl value is between 18.0 mg KOH/g to 56 mg KOH/g, the flow characteristics of the liquid mixture (B) (in the present specification, this refers to the liquid mixture of the polyol mixture (III) and the polyisocyanate compound (IV)) are improved. Consequently filling is sufficient up to the extremity of the die. When the content in terminal oxyethylene units is from 10 to 25% by weight, the flow characteristics of the liquid mixture (B) are improved and the curing time is suitable.

The polyether polyol of the polyol (III-1) may be a mixture of two or more substances. In that case, the average functional groups number, the hydroxyl value and the content in terminal oxyethylene units of the mixture is preferably within the above range of 2.0 to 4.0, 18.0 mg KOH/g to 56 mg KOH/g and 10 to 25% by weight, and more preferably within ranges of 2.0 to 3.0, 28 mg KOH/g to 50 mg KOH/g and a content in terminal oxyethylene units of 15 to 20% by weight.

The chain extender (II-2) for the polyurethane foam includes glycol chain extending agents such as ethylene glycol, butanediol, propylene glycol, hexanediol, neopentylglycol, diethylene glycol, triethylene glycol, polyethylene glycol, dipropylene glycol, polypropylene glycol, or polyhydric alcohols such as glycerin, trimethylolpropane, or polyvalent amines such as ethylenediamine, diethylenetriamine, or alkanolamines such as monoethanolamine, diethanolamine, triethanolamine. Such compounds may be used as required. They may also be in the form of polyether polyols with a short-chain molecular weight (for example 300 or less) with alkylene oxides added thereto.

The amount of the chain extender (III-2) is preferably from 2.0 to 8.0 parts by weight based on 100 parts by weight of the polyol mixture (III). More preferably, it should be from 4.0 to 7.0 parts by weight.

When 2.0 to 8.0 parts by weight of the chain extender (III-2) is used, reactivity is suitable without any adverse effect on the flow characteristics of the liquid mixture (B) when molding the polyurethane foam. Furthermore the surface hardness is from 20 to 70 measured by an Asker C hardness meter and the cure time during molding is suitable.

The catalyst (III-3) may be the same as the catalyst used for the high density polyurethane resin. A generally used normal polyurethane catalyst may be used. Urethane catalysts are amine catalysts or metal catalysts. Examples of amine catalysts include tertiary amines such as triethyenediamine, pentamethyldiethylenetriamine, 1,8-diazabicyclo-5,4,0-undecene-7, dimethylaminoethanol, tetramethylethylenediamine, dimethylbenzylamine, tetramethylhexamethylenediamine, bis(2-dimethyaminoethyl) ether, N,N'-dimethylaminopropylamine, N,N'-dimethylaminopropanol, N,N'-dimethylethanolamine, 1-isobutyl-2-methylimidazole, and tertiary amines such as N-methyl-N'-hydroxyethyl piperazine, N,N'-dimethylaminoethoxyethanol, N,N,N'-trimethylaminoethylethanolamine. Metal catalysts include dimethyltin dilaurate, dibutyltin dilaurate, potassium acetate, potassium octoate, potassium lactate, stannous dioctate. The catalyst (III-3) may comprise an amine catalyst or a metal catalyst used in isolation or may comprise an amine catalyst and a metal catalyst used together.

The amount of the catalyst (III-3) is adjusted so that the cream time of the liquid mixture (B) is 3.0 seconds or less. When the cream time is 3 seconds or less, the viscosity of the pre-injected high density resin does not increase excessively and suitably presses and extends the liquid mixture (A) which has flow characteristics.

"Cream time" means that when, at an ambient temperature of 25° C., using a high-pressure molding machine and the temperature of the mixture polyol (III) and the polyisocyanate compound (IV) at 30° C., the discharge amount of the liquid mixture (A) is adjusted to 200 g/second, the cream time is the time from discharge of 200 g of the liquid mixture (B) until the liquid mixture (B) discharged as foam starts to expand further (visual observation).

The amount of the catalyst (III-3) is preferred to be from 0.10 to 1.50 parts by weight in 100 parts by weight of the polyol mixture (III). In particular, 0.10 to 1.20 parts by weight is preferred. When using the amine catalyst and the metal catalyst in combination, the amount of amine catalyst is from 0.09 to 1.10 parts by weight in 100 parts by weight of the polyol mixture (III). In particular, 0.08 to 1.05 parts by weight is preferred. The amount of metal catalyst is from 0.01 to 0.10 parts by weight in 100 parts by weight of the polyol mixture (III). In particular, 0.02 to 0.05 parts by weight is preferred.

In the present invention, a liquefied carbon dioxide gas must be used as the blowing agent (III-5) and it is preferred that another blowing agent is used in combination with carbon dioxide gas.

The other blowing agent includes organic acids such as formic acid (producing carbon dioxide gas by reacting with polyisocyanate compounds), formic acid derivates, or carbonates of amino compounds (produces carbon dioxide gas by dissociation during the urethane reaction), water (produces carbon dioxide gas by reacting with polyisocyanate compounds), hydrocarbons such as pentane or cyclopentane, or fluorine hydrocarbons such as chlorofluorocarbons (for example, HCFC141b) or fluorocarbons (for example HFC245fa or HFC365mfc). These compounds may be used in combination.

These blowing agents (III-5) are preferably used dissolved in the polyol mixture (III).

Formic acid is preferred for use as the other blowing agent.

When liquefied carbon dioxide gas and formic acid are used in combination, the liquid mixture B (in the present specification, this means the liquid mixture of the polyol mixture (III) and the polyisocyanate compound (IV)) is injected, the liquefied carbon dioxide gas instantaneously expands and foams (froth state) and therefore there is no mixing with the liquid mixture A. However at the same time, since there are sufficient flow characteristics (blowing pressure), the high density resin liquid mixture (A) is pressed and expanded.

Then since the formic acid starts to foam when the foaming of the liquefied carbon dioxide gas is proceeding, the liquid mixture B further presses and expands the high density resin liquid mixture A. This has the advantageous effect that the liquid mixture A is filled in a wide range up to the extremities of the die.

The amount of the liquefied carbon dioxide gas is preferably from 0.1 to 0.6 parts by weight per 100 parts of the polyol compound (III) and 0.2 to 0.5 parts by weight is particularly preferred.

The amount of the other blowing agent, in particular the amount of formic acid is preferably from 0.1 to 0.7 parts by weight per 100 parts of the polyol compound (III) and 0.2 to 0.6 parts by weight is particularly preferred. 0.3 to 0.55 parts by weight is still more preferred.

It is possible to use auxiliary agent as required in the same manner as the high density polyurethane resin. Examples of auxiliary agents (III-4) include foam stabilizers for example a silicon foam stabilizer, interfacial active agents, filling agents, weatherproofing agents such as antioxidants, UV absorbing agents, stabilizers for example 2,6-di-t-butyl-4-methylphenol, tetrakis[methylene-3-(3',5'-di-t-butyl-4-hydroxyphenyl)propionate]methane. The amount of the auxiliary agent (III-4) is 10% or less by weight in 100 parts by weight of the polyol mixture (II), for example 0.1 to 5.0% by weight.

In the present invention, the polyisocyanate compound (IV) can be used in the same manner as in the high density polyurethane resin and can be a polyisocyanate compound having two or more isocyanate groups in the molecule used in a normal polyurethane resin composition. For example, these include aromatic isocyanates such as diphenylmethane diisocyanate, tolylene diisocyanate, polyphenylenepolymethylene polyisocyanate, xylylene diisocyanate, tetramethylxylylene diisocyanate, 1,5-naphthalenediisocyanate, and urethane modified polyisocyanates, carbodiimide modified polyisocyanates, isocyanurate modified derivatives of the above compounds.

Among the above, aromatic polyisocyanates and/or modified derivatives thereof are preferred from the point of view of reactivity and cost of materials.

The mixing ratio of the polyol mixture (III) to the polyisocyanate compound (IV) may be from 90 to 115 as an isocyanate index [(the ratio of the equivalent amount of active hydrogen in polyol mixture (III) to the equivalent amount of isocyanate groups in the polyisocyanate compound (IV))× 100].

The integral skin molded article comprising a core of polyurethane foam and a skin of high density polyurethane resin formed in a single die using reaction injection molding (RIM molding) can be formed using a normal RIM molding machine. For example, a Canon A-System high pressure reaction injection molding machine may be used or two RIM molding machines may be used together for the high density polyurethane resin and for the polyurethane foam.

The temperature of the liquids comprising the polyol mixture (I) and the polyol mixture (III) and the polyisocyanate compound (II) and the polyisocyanate compound (IV) is preferably from 30 to 40° C. When the temperature of the liquid is 30 to 40° C., the reactivity and viscosity of the liquid mixture (A) and the liquid mixture (B) are suitable and flow characteristics are good.

The temperature of the die is preferably from 50 to 80° C. with 50 to 60° C. particularly preferred. When the temperature of the die is from 50 to 80° C., the polyurethane reaction occurs smoothly in the liquid mixture (A) and the liquid mixture (B) and good curing characteristics are obtained.

The use of a high density polyurethane mixture (A) and polyurethane foam (B) adjusted as described above enables the use of the following method for the production of an integral skin molded article comprising high density polyurethane resin and polyurethane foam.

The gel time of the liquid mixture (A) of high density polyurethane resin is adjusted to 10 to 30 seconds, and the liquid mixture (A) is injected into a die. During a 1 to 30 second interval, a liquid mixture (B) having a cream time adjusted to 3.0 seconds or less is injected into the die. Thus an integral skin molded article is obtained having polyurethane foam on a core of a high density polyurethane skin formed on the die inner surface with a skin thickness of high density polyurethane resin of 0.1 to 2.0 mm, or preferably 0.5 to 1.0 mm.

The inner die surface may be pre-coated with a die release agent and a wax type or water type typically used in RIM molding may be used.

Considering the weathering characteristics of the high density polyurethane resin forming the skin, a film formed by applying a coating containing a photostabilizing agent or anti-wear agent may be applied to the die surface. (In-Mold-Coat method).

According to the method, an integral skin molded article having a high density polyurethane resin and polyurethane foam is formed by injecting liquid mixtures (A) and (B) in two stages into a single die and matching the curing time of the high density polyurethane resin and a polyurethane foam to cure in a short time. Thus high-efficiency production is possible together with reductions in costs.

The thickness of the skin is from 0.1 to 2.0 mm, and preferably from 0.5 to 1.0 mm. When only the high density polyurethane resin is considered, the high density polyurethane resin skin has a surface hardness of 50 to 90 measured using an Asker A hardness meter. The density of the polyurethane foam core is from 0.20 to 0.70 g/cm$^3$, and preferably 0.20 to 0.60 g/cm$^3$ and the surface hardness is 20 to 70 measured using an Asker C hardness meter. Therefore a surface hardness at the skin of an integral skin molded article is 30 to 70 using an Asker A hardness meter and an integral skin molded article is obtained which is called as an integral skin form.

The fitting of a core material in the die in advance enables the production of internal parts formed from a laminate with a skin comprising a core material and a polyurethane foam and a high density polyurethane resin in the same manner as the method above and, in particular, the production of a laminate with a skin for use in vehicle internal parts. The laminate with a skin for example can be used as a cover for an airbag. For example, a laminate with a skin used in vehicle internal parts can form the cover of an airbag device for the passenger seat disposed in the instrument panel.

The core material is pre-molded in the shape of the molded article with a skin for use in vehicle internal parts. When the laminate with a skin is used as an airbag, in particular for example, a tear line is formed as a designated rupture section on the rear face of the core material (the opposite face to the face connecting with the skin of the high density polyurethane resin). The laminate with a skin comprises an outer border section which is a non-extended section and a rectangular designated aperture section surrounded by the outer border section. At the designated aperture section, the tear line may take any conventional shape. The tear line may be for example by in the shape of two congruent rectangles joined at one side (that is to say, a shape formed by drawing a line from the central section of one side to the central section of the other side so that one rectangle is divided into two rectangles). The aperture designated section covers the expansion section of the airbag which is normally folded and stored. The tear line is a designated rupture section which enables rupturing and may be termed a tear, a tear groove, a designated rupture line, a designated opening groove or a rupture section. When the airbag expands, the tear line ruptures, the designated aperture section expands and forms the discharge port for the airbag.

The material used in the core material includes for example polypropylene resins, polycarbonate/ABS resins, AGS resins or polyurethane resins. In particular, polypropylene resins are widely applied.

In order to improve the attachment of the core material and the polyurethane foam, the surface of the core material may be flame processed, plasma processed, or processed in order to create anchoring effects or coated with an attachment improving primer.

According to this method, an interior article comprising a laminate with a skin formed from a core material, a high density polyurethane resin and a polyurethane foam is formed by injecting a high density polyurethane resin and a polyurethane foam in two stages into a single die. Thus high-efficiency production is possible due to short time molding together with reductions in manufacturing costs.

The thickness of the skin is from 0.1 to 2.0 mm, and preferably from 0.5 to 1.0 mm. The high density polyurethane resin skin according to the present invention has a hardness of 50 to 90 measured using an Asker A hardness meter. The density of the core is from 0.2 to 0.7 g/cm$^3$ and a polyurethane foam with a surface hardness of 20 to 70 measured using an Asker C hardness meter is used. Therefore a laminate with a skin is obtained which has a hardness at the surface of the laminate with a skin of 30 to 70 using an Asker A hardness meter.

The cover of the airbag device is a fascia covering approximately the whole or about half of the instrument panel. The dimensions of the cover are for example approximately a 1,400 mm with respect to a transverse direction of the vehicle and a longitudinal (depth) dimension of 500 to 600 mm. The cover (that is to say, the laminate with a skin) can cover even a large surface area with a thin skin which has excellent tactile characteristics when touched.

A single gate or a plurality of gates (for example 2 to 8) may be provided in the front face of the instrument panel in order to perform the two stage injection of the high density polyurethane resin and the polyurethane foam. The number of gates may be suitably selected according to the shape of the instrument panel. In general, the distance from the gate through which the urethane raw material flows (that is to say, the raw material used for the high density polyurethane resin and the polyurethane foam) is at most about 700 mm.

EXAMPLES

The invention will be described hereafter in further detail by way of Examples. However the present invention is not limited to the Examples. In the Examples, "parts" and "percentages" are by weight.

A method and standards for evaluating an integral skin molded article comprising high density polyurethane resin and the polyurethane foam are as follows.
(1) An aluminum alloy die having dimensions of 900×300×4 (t) mm and adjusted to 50 to 60° C. was employed to produce an integral skin molded article by RIM molding using two Canon high pressure reaction injection molding machines. Evaluation was performed with respect to the outer appearance, the curing characteristics, by measuring the flow characteristics, the thickness of the skin and the surface hardness of the molded article and by measuring the density and surface hardness of the core.
(2) The conditions for Injection of Liquid Mixture (A) and Liquid Mixture (B)

Injection of liquid mixture (A) was performed using a Canon high pressure reaction injection molding machine. There is not particular limitation on the injected amount, however it may be performed with an injected amount of 300 g/sec, mixing pressure of 15 MPa, and injection time of 1.5 to 2.5 seconds. Within an interval of 5 to 20 seconds after completion of injection of liquid mixture (A), another Canon high pressure reaction injection molding machine is used to inject liquid mixture (B) from another injection port with an injection time of 1.2 to 1.8 seconds (density of the polyurethane foam is assumed to be 0.5 to 0.6 g/cm$^3$) and an injection pressure of 15 MPa.
(3) Evaluation of Outer Appearance and Curing Characteristics (Curing)

The outer appearance of the surface (skin) of the molded article taken from the die was evaluated visually and assessed as "good" if no blisters or surface roughness (voids) were detected or assessed as "poor" if blisters or surface roughness were present.

The curing characteristics were assessed as good if no deformation was seen on the skin when the molded article was directly removed after the curing time (300 seconds) being from the injection of the liquid mixture (B) to the commencement of die opening. When deformations were seen the characteristics were assessed as poor.
(4) Evaluation of Filling Characteristics (Flow Characteristics)

Good (A): liquid mixture (A) and liquid mixture (B) fill up to the extremities of the die and no unfilled sections are evident.

Poor (C): liquid mixture (A) and liquid mixture (B) do not flow up to the extremities of the die and unfilled sections are evident.

(5) Measurement of Thickness of Skin and Surface Hardness

The thickness of the skin was measured using a cross sectional portion of the molded article viewed using an electron microscope.

The surface hardness was measured at a temperature of 25° C. one day after molding using an Asker A hardness meter. Hardness distribution was confirmed.

The determination standard for assessing the hardness distribution assesses the surface hardness of the skin and the core as good if the deflection width is 10 or less and is small, it is assessed as good. If it exceeds 10 and is large, it is assessed as poor.

(Note: the tactile sensation is assessed as good if 10 or less and poor if more than 10).

(6) The measurement of the surface hardness (confirmation of hardness distribution) and the density of the polyurethane foam in the core was performed at 25° C. one day after molding when the core section of the molded article was removed.

The standard for determination of the quality of the hardness distribution in the core is the same as that used for the skin.

The evaluation of the laminate with a skin having a high density polyurethane resin, a polyurethane foam and a core material was performed as follows.

The core material is produced using polypropylene resin and is provided with a tear line in the rear surface (the opposite face to the face connecting with the skin of the high density polyurethane resin). The tear line may, for example, be in the shape of two congruent rectangles connected at one side and aligned together (that is to say, a shape formed by drawing a line from the central section of one side to the central section of the other side so that one rectangle is divided into two rectangles).

A mold (molded article thickness 7.0 mm) for an automobile instrument panel adjusted to 50 to 60° C. was used. A die was used with the core material set in the upper die (the core side of the molded article) for the molded article with a nominal thickness of 3 mm and a depth of the designated rupture section (tear groove) of 0.4 mm (the rupture shape of the designated rupture section is triangular). A laminate with a skin was produced using the die with the core material set therein by RIM molding using two Canon high pressure reaction injection molding machines.

The injection conditions for the liquid mixture (A) and the liquid mixture (B) were the same conditions as those used for molding an integral skin molded article using high density polyurethane resin and polyurethane foam.

(2) Evaluation was performed by examining the external appearance of the laminate with a skin, the curing characteristics, measuring the flow characteristics, thickness of the skin, the surface hardness, and measuring the surface hardness and density of the core of the laminate with a skin. The standard used in the evaluation was the same as that used in the evaluation of the integral skin molded article formed from high density polyurethane resin and polyurethane foam.

(3) Evaluation of Rupture of Skin of Laminate with Skin During Airbag Expansion

The molded article was allowed to stand at ambient temperature (25° C.) for one day after removal from the die. An inner member was mounted in order to attach the airbag module to the rear face of the molded article. The inner member has a pair of aperture reinforcing sections supporting the inner side of the double rectangle and an outer peripheral frame section corresponding to the shape of the approximately double rectangle of the tear line of the core material. The outer peripheral frame section and aperture reinforcing sections are connected by a hinge. The inner member also comprises a vertical wall section (mounting section) provided in a standing position from the outer peripheral frame section. The inner member is mounted in the airbag module by the mounting section. An inflator (Autoliv Co., Ltd.): APPS-4.2 (output 325/440 KPa) is disposed in an inner section of a nylon airbag (volume 119 L) coated internally with silicon. The airbag module with the airbag folded into a fixed shape was assembled into a position corresponding to the designated rupture section on the rear face of the molded article and was allowed to stand for three hours in a constant temperature bath at a fixed temperature (ambient temperature (25° C.), a low temperature (−35° C.) or a high temperature (85° C.) After three hours, each laminate with an assembled airbag was evaluated according to evaluation standards by performing expansion of the airbag at ambient temperature and confirming visually the rupture state of the skin.

The evaluation standard assessed as good if there was a complete rupture along the designated rupture section and the formation of an airbag aperture in a predetermined shape (in other words in accordance with the tear line). A failure to rupture along even a part of the designated rupture section and the failure to form an airbag aperture of a fixed shape was assessed as poor.

The starting materials for a polyether polyol in the polyol (III-1) used in the polyol mixture (III) and the polyol (I-1) used in the polyol mixture (I), the average number of functional groups, the hydroxyl value, the terminal oxyethylene content in addition to chain extenders, catalysts, auxiliary agents, blowing agents or the contents of the polyisocyanate compound (II) and (IV) are shown in Table 1.

Table 2 (Examples) and Table 3 (Comparative Examples) show the proportions used in the molding evaluation of the integral skin molded article and the laminate with a skin comprising high density polyurethane resin and polyurethane foam. The results of evaluating molded articles are respectively shown in Table 4 and Table 5.

The evaluation of the integral skin molded article was as follows.

Example 1

An integral skin molded article for evaluation was prepared using a polyol mixture (I) and a polyisocyanate compound (II) and a polyol mixture (III) and a polyisocyanate compound (IV) shown in Table 1 and used in the proportions shown in Table 2 in a 900×300×4 (t) mm die. The die surface was heated to 50 to 60° C. Molding was performed by RIM molding in two Canon high pressure reaction injection molding machines.

The polyol mixture (I), polyisocyanate compound (II), polyol mixture (III) and a polyisocyanate compound (IV) were heated to 30° C. 300 g/second of liquid mixture (A) was injected over 2.0 seconds at an injection pressure of 15 MPa. At 15 seconds after injection of the liquid mixture (A), 200 g/second of liquid mixture (B) was injected over 1.8 seconds at an injection pressure of 15 MPa.

The liquid mixture (A) has a gel time of 19 seconds (flow characteristics of 9 seconds) and liquid mixture (B) has a cream time of 1 second.

The cure state and external appearance of the obtained molded article were good. Examination of a cross section of the molded article showed no mixing of the skin (liquid mixture (A)) and the core (liquid mixture (B)) and filling was respectively good.

An integral skin molded article with the following characteristics was obtained. The thickness of the skin was from 0.5 to 0.8 mm. The Asker A hardness when only the skin was examined was from 80 to 85. The core density was 0.60 g/cm$^3$ and the Asker C hardness was 50 to 55. The hardness on the skin of an integral skin molded article having a core and a skin with a small distribution of thickness or hardness had an Asker A hardness of 55 to 60.

Since there is a core and a skin with a small distribution of thickness and hardness, the tactile sensation of the molded article, and in particular the tactile sensation from the skin was uniform at each position and assessed as good.

Example 2

At the proportions shown in Table 2, apart from changing the injection conditions of liquid mixture (B) to injecting for 1.5 seconds, at 10 seconds after the injection of liquid mixture (A), the same conditions are used as in Example 1 to prepare an integral skin molded article for evaluation.

The liquid mixture (A) has a gel time of 22 seconds (flow characteristics of 9 seconds) and liquid mixture (B) has a cream time of 3 seconds.

The cure state and external appearance of the obtained molded article were assessed as good. Examination of a cross section of the molded article showed no mixing of the skin and the core and filling was respectively good.

An integral skin molded article with the following characteristics was obtained. The thickness of the skin was from 0.5 to 0.8 mm. The Asker A hardness when only the skin was examined was from 80 to 85. The core density was from 0.50 g/cm$^3$ and the Asker C hardness was 50 to 55. The hardness on the skin of an integral skin molded article having a core and a skin with a small distribution of thickness or hardness had an Asker A hardness of 55 to 60.

Since there is a core and a skin with a small distribution of thickness and hardness, the tactile sensation of the molded article, and in particular the tactile sensation from the skin was uniform at each position and assessed as good.

Example 3

At the proportions shown in Table 2, apart from changing the injection conditions of liquid mixture (B) to injecting for 1.5 seconds, at 8 seconds after the injection of liquid mixture (A), the same conditions are used as in Example 1 to prepare an integral skin molded article for evaluation.

The liquid mixture (A) has a gel time of 19 seconds (flow characteristics of 9 seconds) and liquid mixture (B) has a cream time of 3 seconds.

The cure state and external appearance of the obtained molded article were assessed as good. Examination of a cross section of the molded article showed no mixing of the skin and the core and filling was respectively good.

An integral skin molded article with the following characteristics was obtained. The thickness of the skin was from 0.5 to 0.8 mm. The Asker A hardness when only the skin was examined was 80 to 85. The core density was 0.50 g/cm$^3$ and the Asker C hardness was from 50 to 55. The hardness on the skin of an integral skin molded article having a core and a skin with a small distribution of thickness or hardness had an Asker A hardness of 55 to 60.

Since there is a core and a skin with a small distribution of thickness and hardness, the tactile sensation of the molded article, and in particular the tactile sensation from the skin was uniform at each position and assessed as good.

Example 4

At the proportions shown in Table 2, apart from changing the injection conditions of liquid mixture (B) to injecting for 1.5 seconds, at 15 seconds after the injection of liquid mixture (A), the same conditions are used as in Example 1 to prepare an integral skin molded article for evaluation.

The liquid mixture (A) has a gel time of 16 seconds (flow characteristics of 8 seconds) and liquid mixture (B) has a cream time of 3 seconds.

The cure state and external appearance of the obtained molded article were assessed as good. Examination of a cross section of the molded article showed no mixing of the skin and the core and filling was respectively good.

An integral skin molded article with the following characteristics was obtained. The thickness of the skin was from 0.5 to 0.8 mm. The Asker A hardness when only the skin was examined was from 80 to 85. The core density was 0.50 g/cm$^3$ and the Asker C hardness was 50 to 55. The hardness on the skin of an integral skin molded article having a core and a skin with a small distribution of thickness or hardness had an Asker A hardness of 55 to 60.

Since there is a core and a skin with a small distribution of thickness and hardness, the tactile sensation of the molded article, and in particular the tactile sensation from the skin was uniform at each position and assessed as good.

Comparative Example 1

At the proportions shown in Table 3, apart from changing the injection conditions of liquid mixture (B) to injecting for 1.5 seconds, at 15 seconds after the injection of liquid mixture (A), the same conditions are used as in Example 1 to prepare an integral skin molded article for evaluation.

The liquid mixture (A) has a gel time of 23 seconds (flow characteristics of 24 seconds) and liquid mixture (B) has a cream time of 3 seconds.

When the obtained molded article was removed from the die (die removal), deformation of the skin was evident and the curing state was poor. Furthermore some surface roughness was evident on the skin and the external appearance was poor.

Filling characteristics showed evidence of non-filled parts on a section of the skin. When a cross section of the molded article was viewed, a section of the skin and the core was mixed. The thickness of the skin was 0.3 mm or less at almost all positions. Consequently it was not possible to measure the density or hardness of the core or the hardness of the skin.

Comparative Example 2

At the proportions shown in Table 3, apart from changing the injection conditions of liquid mixture (B) to injecting for 1.5 seconds, at 15 seconds after the injection of liquid mixture (A), the same conditions are used as in Example 1 to prepare an integral skin molded article for evaluation.

The liquid mixture (A) has a gel time of 12 seconds (flow characteristics of 4 seconds) and liquid mixture (B) has a cream time of 3 seconds.

When the obtained molded article was removed from the die (die removal), the curing state was good. However many voids were evident on the skin surface and the external appearance was not good. Filling characteristics in the skin and the core were poor. The thickness of the skin was from 0.8 mm or more at almost all positions. Consequently it was not possible to measure the density or hardness of the core or the hardness of the skin.

Comparative Example 3

At the proportions shown in Table 3, apart from changing the injection conditions of liquid mixture (B) to injecting for 1.5 seconds, at 15 seconds after the injection of liquid mixture (A), the same conditions are used as in Example 1 to prepare an integral skin molded article for evaluation.

The liquid mixture (A) has a gel time of 19 seconds (flow characteristics of 9 seconds) and liquid mixture (B) has a cream time of 4 seconds. Furthermore the liquid mixture (B) during injection remained in liquid state and did not foam.

The curing state of the obtained molded article was poor. Many voids or swellings were evident on the skin and the external appearance was poor. When a cross section of the molded article was examined, the skin and the core were mixed. Unfilled sections were evident in the skin and the core. Consequently it was not possible to measure the density or hardness of the core or the hardness or thickness of the skin.

The evaluation of a laminate with a skin comprising a high density polyurethane resin, a polyurethane foam and a core material was performed as follows.

Example 5

A die (molded article thickness 7.0 mm) for an automobile instrument panel adjusted to 50 to 60° C. was used. A polypropylene core material with a thickness of 3 mm was set into the upper die section (the side of the core of the molded article).

The same proportions as Example 1 were used. A laminate with a skin provided with a designated rupture section was prepared under the same conditions as in Example 1 except that liquid mixture (A) and liquid mixture (B) were injected into the die at 300 g/second for 5.8 and 4.0 seconds respectively.

The cure state and external appearance of the obtained molded article were good. Examination of a cross section of the molded article showed no mixing of the skin (liquid mixture (A)) and the core (liquid mixture (B)) and filling was respectively good.

The observed thickness of the skin was from 0.5 to 0.8 mm and the Asker A hardness was from 80 to 85. The core density was 0.50 g/cm$^3$ and the Asker C hardness was from 50 to 55. A core and a skin with a small thickness and hardness distribution were obtained. Thus a laminate with a skin was obtained which had a hardness on the skin of the integral skin molded article of an Asker A hardness of 55 to 60 and is provided with a designated rupture section.

Since there is a core and a skin with a small distribution of thickness and hardness, the tactile sensation of the molded article, and in particular the tactile sensation from the skin was uniform at each position and assessed as good. The rupture state of the skin of the laminate with a skin when the airbag expanded was complete along the designated rupture section at all temperature conditions of ambient temperature (25° C.), a low temperature (−35° C.) or a high temperature (85° C.). The airbag aperture was formed in a predetermined shape and assessed as good.

Example 6

Under the same molding conditions as Example 5, a laminate with a skin provided was prepared under the same conditions as in Example 2 except that liquid mixture (A) and liquid mixture (B) were injected at 300 g/second for 5.8 and 3.5 seconds respectively.

The cure state and external appearance of the obtained molded article were good. Examination of a cross section of the molded article showed no mixing of the skin (liquid mixture (A)) and the core (liquid mixture (B)) and filling was respectively good.

The observed thickness of the skin was 0.5 to 0.8 mm and the Asker A hardness was from 80 to 85. The core density was 0.50 g/cm$^3$ and the Asker C hardness was from 50 to 55. A core and a skin with a small thickness and hardness distribution were obtained. Thus a laminate with a skin was obtained in which the hardness on the skin of the integral skin molded article was an Asker A hardness of 55 to 60.

Since there is a core and a skin with a small distribution of thickness and hardness, the tactile sensation of the molded article, and in particular the tactile sensation from the skin was uniform at each position and assessed as good.

Example 7

Using a die prepared under the same conditions as Example 5, a laminate with a skin was prepared under the same conditions as in Example 3 except that liquid mixture (A) and liquid mixture (B) were injected at 300 g/second for 6.0 and 3.5 seconds respectively.

The cure state and external appearance of the obtained molded article were good. Examination of a cross section of the molded article showed no mixing of the skin (liquid mixture (A)) and the core (liquid mixture (B)) and filling was respectively good.

The observed thickness of the skin was from 0.5 to 0.8 mm and the Asker A hardness was from 80 to 85. The core density was 0.50 g/cm$^3$ and the Asker C hardness was from 50 to 55. A core and a skin with a small thickness and hardness distribution were obtained. Thus a laminate with a skin was obtained in which the hardness on the skin of the integral skin molded article was an Asker A hardness of 55 to 60.

Since there is a core and a skin with a small distribution of thickness and hardness, the tactile sensation of the molded article, and in particular the tactile sensation from the skin was uniform at each position and assessed as good.

Comparative Example 4

Using a die prepared under the same conditions as Example 5, a laminate with a skin provided with a designated rupture section was prepared under the same conditions as in Comparative Example 1 except that liquid mixture (A) and liquid mixture (B) were injected at 300 g/second for 6.0 and 3.5 seconds respectively.

When the obtained molded article was removed from the die (die removal), deformation of the skin was evident and the curing state was poor. Furthermore some surface roughness was evident on the skin and the external appearance was poor.

Filling characteristics showed evidence of non-filled parts on a section of the skin. When a cross section of the molded article was viewed, a section of the skin and the core was mixed. The thickness of the skin was 0.3 mm or less at almost all positions. Consequently it was not possible to measure the density or hardness of the core or the hardness of the skin.

The rupture state of the skin of the laminate with a skin when the airbag expanded was complete along the designated rupture section at all temperature conditions of ambient temperature (25° C.) or a low temperature (−35° C.). The airbag aperture was formed in a predetermined shape and assessed as good. However rupture was poor at the high temperature (85° C.) since a section did not rupture along the designated rupture section and the airbag aperture was not formed in a predetermined shape.

Comparative Example 5

Using a die prepared under the same conditions as Example 5, a laminate with a skin provided with a designated rupture section was prepared under the same injection conditions for liquid mixture (A) and liquid mixture (B) as in Comparative Example 2 except that liquid mixture (A) and liquid mixture (B) were injected into the die for 5.8 and 4.0 seconds respectively.

When the obtained molded article was removed from the die (die removal), the state of curing was good. However many voids were evident on the skin surface and the external appearance was not good. Filling characteristics in the skin and the core were poor. The thickness of the skin was 0.8 mm or more at almost all positions. Consequently it was not possible to measure the density or hardness of the core or the hardness of the skin.

The rupture state of the skin of the laminate with a skin when the airbag expanded was complete along the designated rupture section at ambient temperature (25° C.) or a high temperature (85° C.). However rupture was poor at a low temperature (−35° C.) since a section did not rupture along the designated rupture section and the airbag aperture was not formed in a predetermined shape.

Comparative Example 6

Using a die prepared under the same conditions as Example 5, a laminate with a skin provided was prepared under the same injection conditions for liquid mixture (A) and liquid mixture (B) as in Comparative Example 3 except that liquid mixture (A) and liquid mixture (B) were injected into the die for 5.8 and 4.0 seconds respectively.

The curing state of the obtained molded article was poor. Many voids or swellings were evident on the skin and the external appearance was poor. Filling characteristics in the skin and the core were poor. The thickness of the skin was 0.8 mm or more at almost all positions. Consequently it was not possible to measure the density or hardness of the core or the hardness or thickness of the skin.

TABLE 1

Starting Materials for High Density Polyurethane Resin and Polyurethane Foam

| | | |
|---|---|---|
| High density polyurethane resin | Polyol mixture (I)<br>Polyol (I-1)<br>Polyether polyol | Starting material: propylene glycol (average functional group number of 2)<br>Hydroxyl value: 45 (mgKOH/g)<br>Terminal oxyethylene content: 15% by weight |
| | Chain extender (I-2) | |
| | Chain extender (I-2-1) | 1-methyl-3,5-diethyl-2,4-diaminobenzene and/or 1-methyl-3,5-diethyl-2,6-diaminobenzene |
| | Chain extender (I-2-2)<br>Catalyst (I-3) | Ethylene glycol |
| | Catalyst (I-3-1) | Ethylene glycol solution of 30% triethylenediamine |
| | Catalyst (I-3-2)<br>Auxiliary (I-4) | Dibutyltin dilaurate |
| | Auxiliary (I-4-1)<br>Polyisocyanate compound (II) | Weatherproofing agents<br>Polyphneylenepolymethylene polyisocyanate<br>NCO content: 31.5%<br>Viscosity: 180 (mPa·s/25° C.) |
| Polyurethane foam | Polyol mixture (III)<br>Polyol (III-1)<br>Polyether polyol | Starting material: Glycerin (average functional group number of 3)<br>Hydroxyl value: 35 (mgKOH/g)<br>Terminal oxyethylene content: 15% by weight |
| | Chain extender (III-2) | |
| | Chain extender (III-2-1)<br>Chain extender (III-2-2)<br>Blowing agent (III-5) | Ethylene glycol<br>Diethanolamine |
| | Blowing agent (III-5-1)<br>Blowing agent (III-5-2)<br>Catalyst (III-3) | Liquefied carbon dioxide gas<br>Formic acid |
| | Catalyst (III-3-1) | Ethylene glycol solution of 30% triethylenediamine |
| | Catalyst (III-3-2)<br>Catalyst (III-3-3)<br>Auxiliary (III-4) | Dibutyltin dilaurate<br>1-1isobutyl-2-ethylimidazole |
| | Auxiliary (III-4-1)<br>Auxiliary (III-4-2)<br>Polyisocyanate compound (IV) | Weatherproofing agents<br>Foam stabilizer<br>Carbodiimide-modified polyisocyanate<br>NCO content: 29.0%<br>Viscosity: 50 (mPa·s/25° C.) |

TABLE 2

Formulation of High Density Polyurethane Resin and Polyurethane Foam

| (Parts by weight) | | Example 1 | Example 2 | Example 3 | Example 4 |
|---|---|---|---|---|---|
| High density polyurethane resin | Polyol mixture (I) | | | | |
| | Polyol (I-1) Polyether polyol | 87.78 | 88.28 | 87.78 | 87.29 |
| | Chain extender (I-2) | | | | |
| | Chain extender (I-2-1) | 2.5 | 1 | 2.5 | 4 |
| | Chain extender (I-2-2) | 9 | 10 | 9 | 8 |
| | Catalyst (I-3) | | | | |
| | Catalyst (I-3-1) | 0.3 | 0.3 | 0.3 | 0.3 |
| | Catalyst (I-3-2) | 0.01 | 0.02 | 0.01 | 0.02 |
| | Auxiliary (I-4) | | | | |
| | Auxiliary (I-4-1) | 0.4 | 0.4 | 0.4 | 0.4 |
| | Total | 100 | 100 | 100 | 100 |
| | Average hydroxyl value (mgKOH/g) | 222 | 231 | 222 | 213 |
| | Weight ratio (parts by weight) polyol mixture (I)/polyisocyanate compound (II) | 100/55.3 | 100/57.6 | 100/55.3 | 100/53.1 |
| | NCO index | 105 | 105 | 105 | 105 |
| Polyurethane foam | Polyol mixture (III) | | | | |
| | Polyol (III-1) Polyether polyol | 92.08 | 91.08 | 91.08 | 91.08 |
| | Chain extender (III-2) | | | | |
| | Chain extender (III-2-1) | 5.5 | 4.6 | 4.6 | 4.6 |
| | Chain extender (III-2-2) | | 1.57 | 1.57 | 1.57 |
| | Blowing agent (III-5) | | | | |
| | Blowing agent (III-5-1) | 0.6 | 0.4 | 0.4 | 0.4 |
| | Blowing agent (III-5-2) | | 0.53 | 0.53 | 0.53 |
| | Catalyst (III-3) | | | | |
| | Catalyst (III-3-1) | 0.6 | 0.6 | 0.6 | 0.6 |
| | Catalyst (III-3-2) | 0.02 | 0.02 | 0.02 | 0.02 |
| | Catalyst (III-3-3) | 0.2 | 0.2 | 0.2 | 0.2 |
| | Auxiliary (III-4) | | | | |
| | Auxiliary (III-4-1) | 0.2 | 0.2 | 0.2 | 0.2 |
| | Auxiliary (III-4-2) | 0.8 | 0.8 | 0.8 | 0.8 |
| | Total | 100 | 100 | 100 | 100 |
| | Average hydroxyl value (mgKOH/g) | 141 | 149 | 156 | 149 |
| | Weight ratio (parts by weight) polyol mixture (III)/polyisocyanate compound (IV) | 100/38.2 | 100/40.4 | 100/40.4 | 100/40.4 |
| | NCO index | 105 | 105 | 105 | 105 |

TABLE 3

Formulation of High Density Polyurethane Resin and Polyurethane Foam

| (Parts by weight) | | Comparative Example 1 | Comparative Example 2 | Comparative Example 3 |
|---|---|---|---|---|
| High density polyurethane resin Polyurethane foam | Polyol mixture (I) | | | |
| | Polyol (I-1) Polyether polyol | 87.77 | 86.29 | 87.78 |
| | Chain extender (I-2) | | | |
| | Chain extender (I-2-1) | | 5 | 2.5 |
| | Chain extender (I-2-2) | 11.5 | 8 | 9 |
| | Catalyst (I-3) | | | |
| | Catalyst (I-3-1) | 0.3 | 0.3 | 0.3 |
| | Catalyst (I-3-2) | 0.03 | 0.01 | 0.01 |

TABLE 3-continued

Formulation of High Density Polyurethane Resin and Polyurethane Foam

|  | (Parts by weight) | Comparative Example 1 | Comparative Example 2 | Comparative Example 3 |
|---|---|---|---|---|
|  | Auxiliary (I-4) |  |  |  |
|  | Auxiliary (I-4-1) | 0.4 | 0.4 | 0.4 |
|  | Total | 100 | 100 | 100 |
|  | Average hydroxyl value (mgKOH/g) | 251 | 219 | 222 |
|  | Weight ratio (parts by weight) polyol mixture (I)/polyisocyanate compound (II) | 100/62.7 | 100/54.6 | 100/55.3 |
|  | NCO index | 105 | 105 | 105 |
| Polyurethane foam | Polyol mixture (III) |  |  |  |
|  | Polyol (III-1) |  |  |  |
|  | Polyether polyol | 91.08 | 91.08 | 91.08 |
|  | Chain extender (III-2) |  |  |  |
|  | Chain extender (III-2-1) | 4.6 | 4.6 | 5.1 |
|  | Chain extender (III-2-2) | 1.57 | 1.57 | 2.55 |
|  | Blowing agent (III-5) |  |  |  |
|  | Blowing agent (III-5-1) | 0.4 | 0.4 |  |
|  | Blowing agent (III-5-2) | 0.53 | 0.53 | 0.85 |
|  | Catalyst (III-3) |  |  |  |
|  | Catalyst (III-3-1) | 0.6 | 0.6 | 1.2 |
|  | Catalyst (III-3-2) | 0.02 | 0.02 | 0.02 |
|  | Catalyst (III-3-3) | 0.2 | 0.2 | 0.2 |
|  | Auxiliary (III-4) |  |  |  |
|  | Auxiliary (I-4-1) | 0.2 | 0.2 | 0.2 |
|  | Auxiliary (I-4-2) | 0.8 | 0.8 | 0.8 |
|  | Total | 100 | 100 | 100 |
|  | Average hydroxyl value (mgKOH/g) | 149 | 149 | 180 |
|  | Weight ratio (parts by weight) polyol mixture (III)/polyisocyanate compound (IV) | 100/40.4 | 100/40.4 | 100/48.7 |
|  | NCO index | 105 | 105 | 105 |

TABLE 4

Evaluation of Integral Skin Molded Article

| Integral skin molded article | Example 1 | Example 2 | Example 3 | Example 4 | Comparative Example 1 | Comparative Example 2 | Comparative Example 3 |
|---|---|---|---|---|---|---|---|
| High density polyurethane resin liquid mixture (A) |  |  |  |  |  |  |  |
| Injection amount (rate, g/sec) | 300 | 300 | 300 | 300 | 300 | 300 | 300 |
| Gel time (sec) | 19 | 22 | 19 | 16 | 23 | 12 | 19 |
| Flow characteristics (time, sec) | 9 | 9 | 9 | 8 | 24 | 4 | 9 |
| Polyurethane foam liquid mixture (B) |  |  |  |  |  |  |  |
| Injection amount (rate, g/sec) | 200 | 200 | 200 | 200 | 200 | 200 | 200 |
| State of liquid mixture upon injection | foamy | foamy | foamy | foamy | foamy | foamy | foamy |
| Cream time (sec) | 1 | 3 | 3 | 3 | 3 | 3 | 4 |
| Time (sec) from injection of liquid mixture (A) to injection of liquid mixture (B) | 15 | 10 | 8 | 15 | 15 | 15 | 15 |
| Curing time (sec) of integral skin molded article | 300 | 300 | 300 | 300 | 300 | 300 | 300 |
| Curing state (A: Good, C: Poor) | A | A | A | A | C | A | C |
| Outer appearance (A: Good, C: Poor) | A | A | A | A | C | C | C |
| Filling Characteristics (Flow Characteristics) |  |  |  |  |  |  |  |
| Surface (A: Good, C: Poor) | A | A | A | A | C | C | C |

TABLE 4-continued

Evaluation of Integral Skin Molded Article

| Integral skin molded article | Example 1 | Example 2 | Example 3 | Example 4 | Comparative Example 1 | Comparative Example 2 | Comparative Example 3 |
|---|---|---|---|---|---|---|---|
| Core (A: Good, C: Poor) | A | A | A | A | A | C | C |
| Mixing state of skin and core (A: None, C: Exist) | A | A | A | A | C | A | |
| Thickness of skin (thickness distribution: mm) | 0.5-0.8 | 0.5-0.8 | 0.5-0.8 | 0.5-0.8 | <0.3 | >0.8 | |
| Asker A hardness | 80-85 | 80-85 | 80-85 | 80-85 | | | |
| Distribution of hardness | small | small | small | small | | | |
| Core (polyurethane foam) | | | | | | | |
| Density (g/cm³) | 0.60 | 0.50 | 0.50 | 0.50 | | | |
| Asker C hardness | 50-55 | 50-55 | 50-55 | 50-55 | | | |
| Hardness of skin on integral skin molded article | | | | | | | |
| Asker A hardness | 55-60 | 55-60 | 55-60 | 55-60 | | | |

TABLE 5

Evaluation of Laminate with Skin

| Laminate with skin | Example 5 | Example 6 | Example 7 | Comparative Example 4 | Comparative Example 5 | Comparative Example 6 |
|---|---|---|---|---|---|---|
| Curing time (sec) of laminate with skin | 300 | 300 | 300 | 300 | 300 | 300 |
| Curing state (A: Good, C: Poor) | A | A | A | C | A | C |
| Outer appearance (A: Good, C: Poor) | A | A | A | B | C | C |
| Filling Characteristics (Flow Characteristics) | | | | | | |
| Surface (A: Good, C: Poor) | A | A | A | C | C | C |
| Core (A: Good, C: Poor) | A | A | A | A | C | C |
| Mixing state of skin and core (A: None, C: Exist) | A | A | A | C | A | |
| Thickness of skin (thickness distribution: mm) | 0.5-0.8 | 0.5-0.8 | 0.5-0.8 | >0.3 | <0.8 | |
| Asker A hardness | 80-85 | 80-85 | 80-85 | | | |
| Distribution of hardness | small | small | small | | | |
| Core (polyurethane foam) | | | | | | |
| Density (g/cm³) | 0.50 | 0.50 | 0.50 | | | |
| Asker C hardness | 50-55 | 50-55 | 50-55 | | | |
| Hardness of skin on laminate with skin | | | | | | |
| Asker A hardness | 55-60 | 55-60 | 55-60 | | | |

The invention claimed is:

1. A laminate with a skin, comprising a high density polyurethane resin having a density of from 0.85 g/cm³ to 1.10 g/cm³, a polyurethane foam and a core material, wherein the high density polyurethane resin and the polyurethane foam comprise an integral skin molded article, and the core material is bonded to the skin of the high density polyurethane resin, wherein a tear line is formed as a designated rupture section which is provided on a face, opposite to a face connecting with the skin, of the core material so as to form an airbag aperture, wherein the integral skin molded article comprising a skin of the high density polyurethane resin and a core of the polyurethane foam, which is molded in a die using a reaction injection molding process, the high density polyurethane resin comprises a polyol mixture (I) comprising a polyol (I-1), a chain extender (I-2), a catalyst (I-3) and, if required, an auxiliary agent (I-4), and a polyisocyanate compound (II);

the chain extender (I-2) contains 0.7 to 4.5 parts by weight of 1-methyl-3,5-diethyl-2,4-diaminobenzene and/or 1-methyl-3,5-diethyl-2,6-diaminobenzene based on 100 parts by weight of the polyol mixture (I);

the polyurethane foam comprises a polyol mixture (III) comprising a polyol (III-1), a chain extender (III-2), a catalyst (III-3), a blowing agent (III-5) and, if required, an auxiliary (III-4) agent, and a polyisocyanate compound (IV);

the blowing agent (III-5) contains a liquefied carbon dioxide gas; and a surface hardness of the high density polyurethane resin is from 50 to 90 measured with an Asker A hardness meter, a density of the polyurethane foam is from 0.20 to 0.70 g/cm³ and has a hardness of 20 to 70 measured with an Asker C hardness meter, and the hardness on the skin of the integral skin molded article is from 30 to 70 measured with an Asker A hardness meter.

* * * * *